United States Patent [19]

Molitor

[11] Patent Number: 4,531,572
[45] Date of Patent: Jul. 30, 1985

[54] METHOD OF AND UNIT FOR RECOVERY OF WASTE ENERGY

[76] Inventor: Victor D. Molitor, 7300 West Stetson Place, #46, Denver, Colo. 80213

[21] Appl. No.: 613,915

[22] Filed: May 25, 1984

Related U.S. Application Data

[63] Continuation-in-part of Ser. No. 191,523, Sep. 29, 1980, abandoned, which is a continuation-in-part of Ser. No. 130,615, Mar. 17, 1980, abandoned, which is a continuation-in-part of Ser. No. 920,660, Jun. 30, 1978, abandoned.

[51] Int. Cl.³ .............................................. F24H 1/00
[52] U.S. Cl. ......................................... 165/1; 134/10; 134/105; 134/107; 126/350 C; 165/47; 165/DIG. 12; 219/201; 219/279; 219/281; 219/306; 219/312; 219/316
[58] Field of Search ................ 165/47, DIG. 12, 164, 165/165, 1; 219/201, 279, 281, 306, 312, 314, 316; 134/56, 10, 57, 58, 100, 60, 105, 107, 108, 110; 126/350 C, 350 D

[56] References Cited

U.S. PATENT DOCUMENTS

| | | | |
|---|---|---|---|
| 631,426 | 8/1899 | Lanphear | 165/145 |
| 1,664,637 | 4/1928 | Merseles | 134/60 |
| 1,799,081 | 3/1931 | Blomquist | 165/164 |
| 1,840,940 | 1/1932 | Ecabert | 165/47 |
| 1,887,569 | 11/1932 | St. Palley | 165/47 |
| 2,949,119 | 8/1960 | Smith | 134/108 |
| 3,923,073 | 12/1975 | Jacobs | 134/108 |
| 4,150,787 | 4/1979 | Braathen | 219/279 |
| 4,156,621 | 5/1979 | Andrews et al. | 134/10 |
| 4,202,406 | 5/1980 | Avery | 165/47 |
| 4,256,176 | 3/1981 | Cohen | 165/163 |
| 4,282,421 | 2/1981 | Hadar | 165/132 |
| 4,300,247 | 11/1981 | Berg | 219/279 |
| 4,304,292 | 12/1981 | Cardone et al. | 165/47 |

FOREIGN PATENT DOCUMENTS

| | | | |
|---|---|---|---|
| 2415877 | 10/1975 | Fed. Rep. of Germany | 165/DIG. 12 |
| 2501165 | 7/1976 | Fed. Rep. of Germany | 165/DIG. 12 |
| 2517126 | 11/1976 | Fed. Rep. of Germany | 165/DIG. 12 |
| 2806029 | 8/1979 | Fed. Rep. of Germany | 165/DIG. 12 |
| 2905251 | 10/1979 | Fed. Rep. of Germany | 165/DIG. 12 |
| 494308 | 12/1918 | France | 165/47 |
| 621168 | 1/1927 | France | 134/107 |
| 2464688 | 4/1981 | France | 138/107 |
| 483084 | 7/1953 | Italy | 134/107 |
| 243875 | 12/1925 | United Kingdom | 126/350 C |
| 2052698 | 1/1981 | United Kingdom | 219/279 |
| 1595319 | 8/1981 | United Kingdom | 165/47 |

Primary Examiner—Albert W. Davis, Jr.
Attorney, Agent, or Firm—Horace B. Van Valkenburgh; Jerry W. Berkstresser

[57] ABSTRACT

Transfer waste water from wash cycle of dishwasher to collection tank beneath heat exchanger surrounding hollow central space, pass waste water through dual tube heat exchanger in countercurrent relation to cool feed water for hot water heater in central space of heat exchanger, supply heat to water in heater, then hot water to dishwasher rinse. May circulate feed water downwardly through outer space of heater, formed by partition, to lower end of inner space, in which heat is supplied by electrical immersion heaters. Ends of tank of hot water may be semi-oval, semi-elliptical or the like, while partition may be sufficiently close to bottom of tank to produce a wire-drawing effect as inlet water flows from outer to inner space, thereby maintaining light or small particles which fall off electric heaters in circulation, so that such particles will be removed with hot water. Heavier particles will collect in bottom of tank and may be drained periodically.

18 Claims, 20 Drawing Figures

METHOD OF AND UNIT FOR RECOVERY OF WASTE ENERGY

This application is a continuation-in-part of my co-pending application Ser. No. 191,523 filed Sept. 29, 1980 (now abandoned), in turn is a continuation-in-part of my application Ser. No. 130,615 filed Mar. 17, 1980 (now abandoned) filed as a continuation-in-part of my application Ser. No. 920,660 filed June 30, 1978 (now abandoned).

This invention relates to a method of and unit for recovering waste energy.

BACKGROUND OF THE INVENTION

My aforesaid application Ser. No. 130,615 discloses a method of and apparatus for the recovery of waste energy which includes a heat exchanger which receives heated waste water discharged from a dishwasher or the like to preheat the cold water supply to a hot water heater which supplies the dishwasher with hot water for the wash and rinse cycles. Such application also discloses the desirability of controlling the flow of waste water to the heat exchanger at a time when the dishwasher or the like requires hot water from the hot water heater, so that preheated feed water will be supplied. This heat exchanger is mounted in the upper portion of a unit having a housing, while a lower portion of the unit contains a tank for receiving the waste dishwater which passes through a removable screen above the tank. The tank is bordered by an overflow partition which separates an outlet area therefrom. The collected waste water is pumped from a sump beneath the tank to one inlet of the heat exchanger above, while the used waste water, after heat exchange, is discharged into the outlet area. The unit is installed beneath the dish counter of the dishwasher, or a similar closely adjacent position, rather than at a remote location adjacent to the hot water heater, as in my prior application Ser. No. 920,660. Since a hot water heater is often located at some distance from the dishwasher, under which the unit is placed, and the hot water heater may supply other facilities, such as wash rooms, sinks and the like, insulation is usually necessary in order to prevent the preheated feed water from becoming unduly cooled by passage to the hot water heater. However, the expense of installing the piping and insulation may reduce the savings due to recovery of waste energy.

There are two general types of dishwashers in use, one being referred to as a "high temperature" dishwasher and operates with water at about 180° F. for rinsing and the waste water at about 140° F. Normally, the wash water is used rinse water which has been retained in a separate space in the dishwasher for that purpose and then saponified, so that hot water is drawn from the hot water heater during the rinse cycle only. Thus, the used wash water would be saved until the next rinse cycle, while the hot water heater would be capable of heating the water to 190° or 195° F. to supply rinse water at 180° F. The other is referred to as a "low temperature" type and utilizes a special detergent. This type operates with water at a temperature of about 140° F. for rinsing, with the waste water at about 125° F. In each type, the amount of water used for rinsing is within the capacity of electric heaters to produce.

Among the objects of this invention are to provide a novel method and unit for recovering waste energy, particularly from equipment such as a dishwasher; to provide a method and unit which involves a heat exchanger for preheating incoming water to be heated to an appropriate temperature for rinsing dishes through heat exchange with the waste water from the dishwasher, normally wash water; to provide such a unit which may be positioned adjacent or beneath a dishwasher and also supply hot water thereto, without the necessity for transferring the waste water or the hot water being supplied through pipes for any great distance; to provide such a unit in which special provision is made for avoiding overheating the electric heaters and thereby burning out the same, when hot water for rinsing is supplied to a high temperature dishwasher, but which special equipment may be omitted when hot water is supplied to a low temperature dishwasher; and to provide such a method and unit which are effective and efficient in use.

SUMMARY OF THE INVENTION

The energy recovery method of this invention includes transferring waste water from the wash cycle of a dishwasher or the like to a collection tank located beneath a heat exchanger having a hollow central space, passing the waste water through the heat exchanger in countercurrent relation to cool feed water for a hot water heater which occupies the central space of the heat exchanger, supplying heat to the water in the heater and supplying hot water to the dishwasher or the like. Such method may also include circulating incoming feed water downwardly through an outer space of the hot water heater to a connection with the lower end of an inner space, in which heat is supplied by electrical immersion heaters. Such method may also include venting fluid at excess pressure and/or temperature from the hot water heater to the waste water collection tank, as well as recirculating water from the outlet to the inlet of the hot water heater to prevent overheating the electrical heaters through accumulation of higher temperature water or steam about the heaters, where generally upright and which does not move away due to lack of circulation when there is no withdrawal to the dishwasher. The energy recovery unit of this invention includes a housing enclosing a heat exchanger having coils disposed about a central space and a hot water heater in the central space. The hot water heater may include an upright tank in which immersion type electrical heaters are disposed, which has an inwardly spaced partition providing an outer space and a larger, inner heating space with the partition terminating above the lower end of the tank, while the inlet for preheated feed water is adapted to produce an annular circulation in the outer space. A recirculation pump may be connected between the inlet and outlet of the tank and a pressure relief valve may exhaust through a pipe leading through a corner of the housing to a collection tank for waste water beneath the heat exchanger.

Additional objects and novel features of this invention will become apparent from the description which follows, taken in conjunction with the accompanying drawings.

DESCRIPTION OF THE PREFERRED EMBODIMENT

Figure 1:
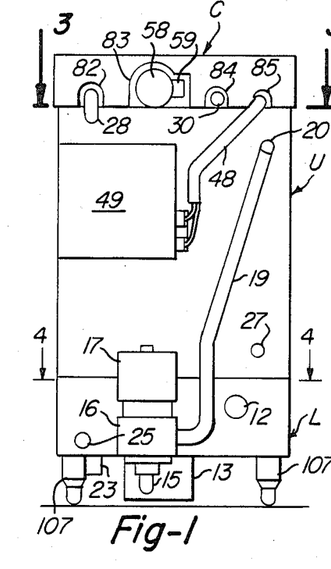
FIG. 1 is a rear elevation of an energy recovery unit of this invention, particularly adapted to be used with a dishwasher.
Figure 3:
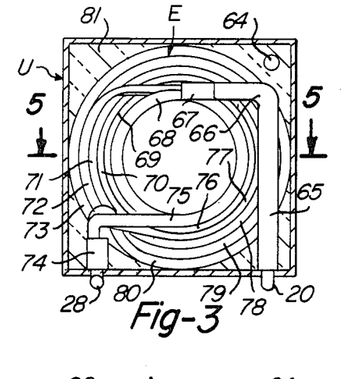
FIG. 3 is a cross section taken at line 3—3 of FIG. 1, with certain parts omitted for clarity of illustration.
Figure 7:
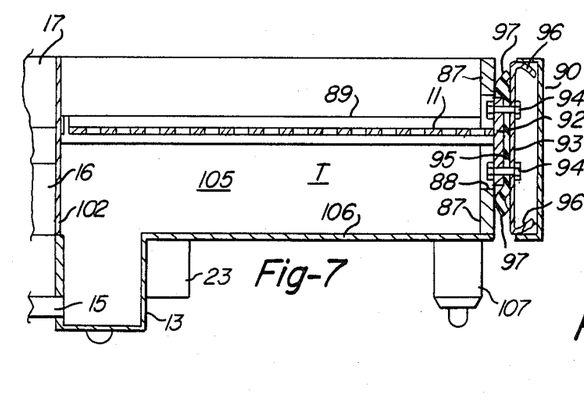
FIG. 7 is a vertical section taken along line 7—7 of FIG. 4.

The energy recovery unit illustrated in the drawings may be placed beneath a dish table of a conventional dishwasher, similar to the heat exchanger and holding tank unit of my aforesaid copending application Ser. No. 130,615, or other position convenient to the dishwasher, or other equipment which supplies a liquid from which heat may be recovered, it being understood that reference to "water" herein encompasses any other liquid. Such embodiment includes an upper housing U which encloses a heat exchanger E of FIGS. 3 and 5, which surrounds a water heater W of FIG. 5. Heat exchanger E is similar to a corresponding heat exchanger of my aforesaid application Ser. No. 130,615 and is preferably constructed in accordance with my copending application Ser. No. 20,615 filed Mar. 15, 1979, as indicated previously, while water heater W of FIG. 5, in accordance with this invention, occupies the area within the coils of heat exchanger E and is specially constructed. Water heater W conveniently rests on a pad 10 of insulating material in the lower end of upper housing U. A shorter, lower housing L, similar to a corresponding portion of a unit of my aforesaid copending application Ser. No. 130,615, encloses a holding tank T of FIGS. 5 and 7, into which the waste dishwater flows through a screen 11 from waste dishwasher inlet 12 of FIGS. 1 and 5. A sump 13 of FIG. 1 provides a supply of warm water, through an outlet 14 of FIG. 5 and a pipe 15 of FIG. 1, to a pump 16 which is driven by a motor 17, while a level sensitive device 18 of FIG. 5, such as a float controlled switch, prevents the pump motor 17 from starting unless the sump is full. As in my aforesaid application Ser. No. 130,615, pump motor 17 and consequently, pump 16, is controlled so as to pump warm waste water through the heat exchanger E when the dishwasher controls call for hot water to be supplied from water heater W, thereby insuring that preheating of the feed water for the water heater will take place at the same time as hot water is withdrawn from the water heater. From pump 16, the warm water is supplied through a hose 19 to an upper inlet connection 20 of FIG. 3 for the heat exchanger. After passage through the heat exchanger, the preferred construction of which will be described later, the water exhausts from a lower outlet sleeve 21 of FIG. 5 and a pipe 22 which discharges directly into a cup 23 which depends from the lower housing beneath an outlet chamber 24, which adjoins tank T for a purpose described in my aforesaid application Ser. No. 130,615 and referred to herein later. Waste water collecting in outlet chamber 24 is discharged through an outlet 25 of FIGS. 1 and 5. A cold water inlet 27 of FIG. 1 is connected to a conventional supply pipe (not shown) and also to the lower ends of alternate tubes of the heat exchanger E for flow in an upward direction, countercurrent to the downward flow of the warm water from which heat is to be recovered, as in my aforesaid application Ser. No. 130,615. From the upper end of the heat exchanger, the preheated supply water passes through a U-fitting 28 which extends upwardly and forwardly, into the space above upper housing U and within a cover C, to a pipe 29 of FIG. 2 which supplies the water heater W. A hot water outlet pipe 30 extends rearwardly from the hot water heater and is connected to a conventional hot water supply pipe or flexible hose for supplying the dishwasher.

Figure 5:
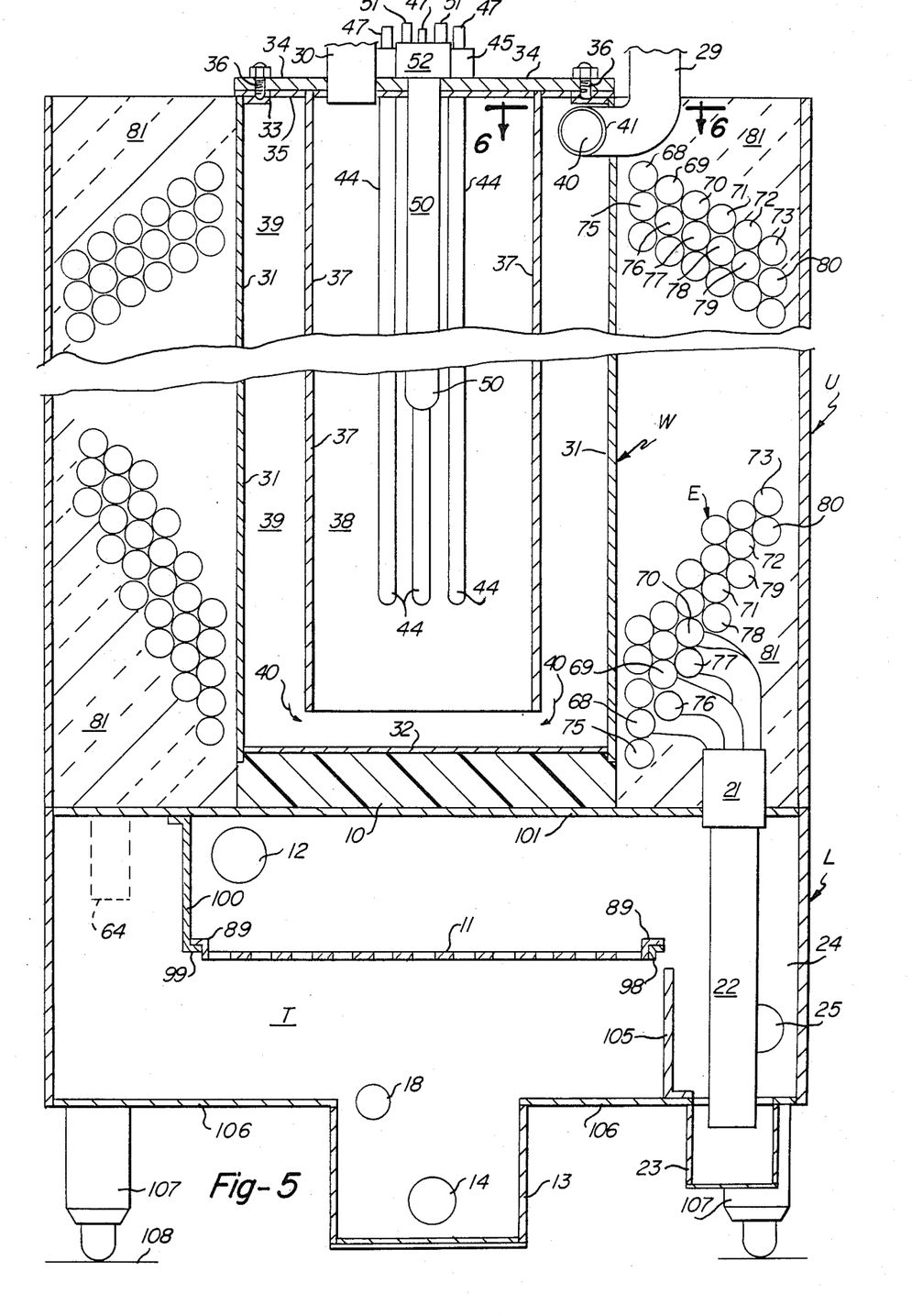
FIG. 5 is an offset vertical section, on an enlarged scale and with the section through the upper housing being along line 5—5 of FIG. 2 and the section through the lower housing being along line 5—5 of FIG. 3.
Figure 6:
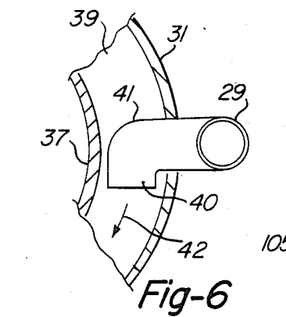
FIG. 6 is a fragmentary section, on an enlarged scale, taken along line 6—6 of FIG. 5.

The hot water heater W, as in FIG. 5, includes a cylindrical outer shell 31 having a bottom disc 32 attached thereto, as by welding. Outer shell 31 is provided with an inwardly extending upper flange 33 for attachment to a heavier, top circular plate 34, with a gasket 35 between, as by studs 36 spot welded to the flange. Within shell 31 and spaced inwardly therefrom is a partition, such as a cylindrical ring 37, attached to the underside of plate 34, as by welding, and open at the bottom, as well as spaced from disc 32 to provide a larger central space 38 in which heating takes place and a smaller, annular entrance space 39 through which incoming water will flow downwardly and around the lower edge of ring 37, as indicated by the arrows 40. Inlet pipe 29 extends through shell 31 and is provided with an ell 41 which causes the inlet water to flow circumferentially in the annular space 39, as indicated by arrow 42 of FIG. 6, so that the incoming cold feed water will flow, as indicated by arrows 40, smoothly and without turbulence around the lower edge of ring 37, so that the heated water will flow evenly from the central space through outlet pipe 30 and incoming cold feed water will not mix with previously heated water during discharge of hot water from the heater. Since the space 39 receives warmed water directly from the heat exchanger, the differential in temperature is small and insulation between outer shell 31 and heat exchanger E is normally unnecessary.

The water in space 38 is conveniently heated by immersion type electrical resistance heaters, such as two sets of three U-shaped calrod heaters 44, each set of which depends from a mounting block 45 on plate 34 and receives current through wires in cables 46 and 46' which are connected to posts 47 of FIG. 5 and extend through an electrical conduit 48, which in turn extends rearwardly and then downwardly to an electrical control box 49 mounted on the rear of upper housing U. Also extending through plate 34 is a thermostat 50, having terminals 51 and a mounting plug 52, and depending from plate 34 centrally of the space 38. Thermostat 50 is connected by wires in a cable 53 with a control box 54 having a conventional temperature control setting device and a temperature indicator 55. Cable 53 also extends into conduit 48 for passage to main control box 49 of FIG. 1.

In order to prevent localized overheating and damage to the heaters 44, particularly when the hot water heater is supplying hot water at a higher temperature, such as approaching the boiling point, for a so-called high temperature dishwasher, a portion of the hot water from outlet pipe 30 is recirculated to inlet pipe 29 by a pump 57 which pumps in the direction of the arrow thereon and is driven by a motor 58 having a control box 59. The inlet of pump 57 is connected to a reducing tee 60 installed in pipe 30 and the outlet thereof is connected to a similar reducing tee 61 installed in pipe 29. Pump 57 is operated only when heaters 44 are turned on and merely prevents localized overheating of the heaters. However, operation of the pump 57 normally results in a larger amount of hot water being available, since recirculation through inlet pipe 29 tends to cause the entire space 38 to be filled with hot water and warmer water to fill space 39. Recirculation by pump 57 does not interfere with the non-turbulent flow of water from passage 39 around the lower edge of ring 37, since recirculation produces a flow but ell 41 reduces the turbulence of that flow. Also, the heaters 44 should be designed so that there will be enough hot water in the heater when the dishwasher requires it, so that the heaters should be turned off, with pump 57 also turned off, before or when the hot water is required. Consideration should be given to the omission of pump 57 and associated parts, including recirculation tees 60 and 61, when the hot water heater supplies a so-called low temperature dishwasher.

Figure 2:
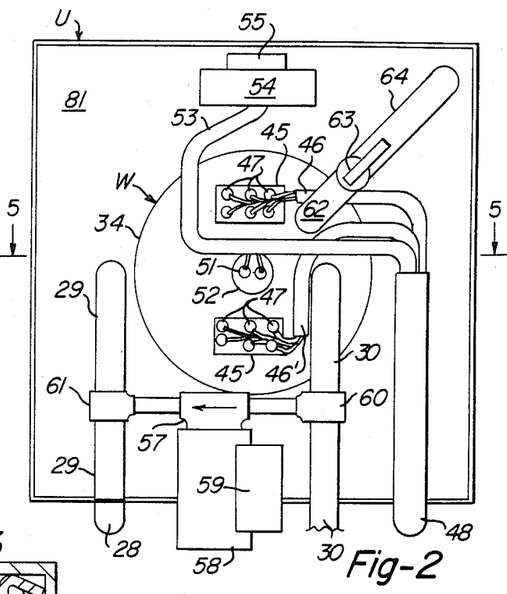
FIG. 2 is a top plan view on an enlarged scale, of an upper housing of the unit of FIG. 1, with a top cover removed.
Figure 4:
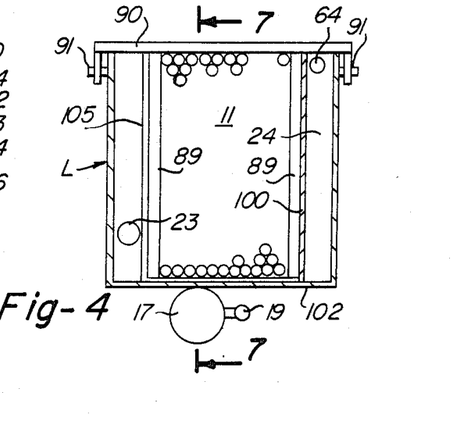
FIG. 4 is a cross section of a lower housing, taken along line 4—4 of FIG. 1.

A pressure relief pipe 62, extending through plate 34 to space 38 in the same manner as pipe 30, as in FIG. 5, but at a different position, as in FIG. 2, connects with a pressure relief valve 63 having a handle, as shown, for manual actuation, as well as being adjustable to open at a desired pressure. When pressure relief valve 63 is activated, flow is through a pipe 64 which extends downwardly in a corner of upper housing U, as in FIGS. 3 and 4, for discharge into tank T. The lower end of pipe 64 is shown in dotted lines in FIG. 5 to indicate its relative lateral position, although it is actually in the front rather than the rear of the lower housing L.

In the heat exchanger E, similar to the unit of my aforesaid application Ser. No. 130,615, from inlet fitting 20 of FIG. 3, the incoming warm water is supplied through a tube 65, an ell 66 and a sleeve 67 to a series of coiled tubes 68, 69, 70, 71, 72, and 73, the inlet ends of which are sealed to the inside of the sleeve 67 and to each other. The opposite ends of tubes 68 to 73, inclusive, are connected to sleeve 21 of FIG. 5. Cold water outlet 28 of FIG. 1 is connected to a sleeve 74 similar to sleeve 67 but connected to the upper ends of coiled tubes 75, 76, 77, 78, 79 and 80 which are wound into coils simultaneously with tubes 68 to 73, respectively, so that, as in FIG. 5, tubes 68 and 75 will alternate in the first inside coil, tubes 69 and 76 will alternate in the second coil, and tubes 70, 77, tubes 71, 78, tubes 72, 79 and tubes 73, 80 will alternate in the succeeding coils. The tubes of each coil are wound in the groove between two tubes of the preceding coil, while a heat conduct mastic is squeezed between the tubes during winding. The lower ends of tubes 75 to 80, inclusive, are received by a sleeve similar to sleeve 74 of FIG. 3 but which is connected to a cold water inlet pipe at inlet 27 of FIG. 1 in a conventional manner. Insulation 81 may be placed around the heat exchanger E, such as a plastic foam which is injected into the space around the heat exchanger and up to the open top of upper housing H. Such insulation also provides support for the heat exchanger during transportation. Insulation may also be placed around pipes 29 and 30, as well as in the space within cover C which encloses the parts extending above the upper housing and is provided with slots 82, 83, 84 and 85 for outward extension of parts.

Figure 8:
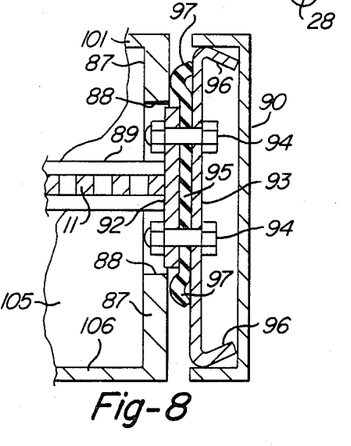
FIG. 8 is an enlargement of a right hand, upper portion of FIG. 7.
Figure 9:
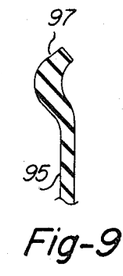
FIG. 9 is an enlarged cross section of a portion of a gasket shown also in FIG. 8.

The front wall 87 of lower housing L, as in my aforesaid application Ser. No. 130,615, is provided with a generally rectangular opening 88 of FIGS. 7 and 8 having a lower portion of lesser width which provides ledges to accommodate angular slide flanges 89 of screen 11, shown in FIGS. 4, 5 and 7. Screen 11 has holes of an appropriate diameter to permit the waste water to flow through but catch any food refuse or material larger than a predetermined size. A cover 90, to which screen 11 is attached, is in turn removably attached to the front wall by a latch 91 at each side, as in FIG. 4. The screen is, of course, removable by unhooking the latches 91 and removing the front cover and the screen with it, then replacing the cover and screen, after the screen has been cleaned off. An improvement, in accordance with this invention, in the screen sealing and mounting, includes its attachment, as by welding, to a front plate 92, by which the screen may be removably attached to a mounting plate 93 in a conventional manner, as by a series of bolts 94 of FIG. 8 which also clamp a molded gasket 95 between front plate 92 and mounting plate 93, which has spring edges 96 which engage the inside of the top, bottom and ends of cover 90. Gasket 95 is rectangular and provided with a convex lip 97 on all four sides, which is compressed between housing front plate 87 and mounting plate 93 around but spaced from all edges of the opening 88. Gasket 95 may be formed of any suitable compressible material, such as rubber or plastic, to provide the desired seal.

As the screen is inserted, one of the screen flanges 89 will slide along the top flange of an angular guide bar 98 of FIG. 5, similar to the screen of my aforesaid application Ser. No. 130,615, and the opposite flange 89 will slide along a flange 99 at the lower edge of a plate 100 which depends from and is attached to the top wall 101 of the lower housing L. Guide bar 98, as in FIG. 7, extends between and is attached to front wall 87 and rear wall 102 of the lower housing. A baffle 105 beneath the outer, lower edge of guide angle 98, as in FIG. 5 and also as in my aforesaid application Ser. No. 130,615, extends alongside the cup 23 and permits overflow of excess waste liquid from the tank beneath screen 11 to flow into outlet area 24 and thence flow through outlet 25 and through a hose or pipe to the sewer, or to another piece of equipment. Baffle 105 extends between and is attached to front wall 87 and rear wall 102, as well as to bottom wall 106 of the lower housing, to the underside of which supporting legs 107 are attached. Legs 107 are of a height which permits depending sump 13 to clear the floor 108.

One advantage of the outlet area 24 is that it tends to render the screen 11 self-cleaning, since the waste dishwater inlet 12 is at the opposite side of the screen from the outlet area 24. Thus, if the screen becomes clogged, the waste water will flow across the screen and over side flange 89 into the outlet or discharge area and tend to carry with it material which clogs the screen. A similar result occurs in the event that there is a malfunction of the float or level indicator 18 or the pump 16, so that the waste water is not removed from the tank on one cycle and the level of water in the tank rises over the top of the baffle 105. In such an event, water which continues to pass through the screen will tend to overflow the baffle, but for complete discharge of the waste water, this overflow would be insufficient, so that the excess will flow across the screen and into the discharge area 24, tending to carry with it any material collected on the screen.

An alternative water heater W' of FIGS. 10-13 includes a tubular shell 31 which is attached, as by welding, to a generally semi-elliptical upper head 118 which extends through an appropriate opening in a partition 119 above the heat exchanger, which includes tubes 68, 69, 70 and 75, 76, 77 arranged in the manner described previously. Plates 120 and a flanged plate 121 of upper housing U' extend above partition 119, while a top plate (not shown) is attached across the upper ends of plates 120 and 121.

Figure 11:
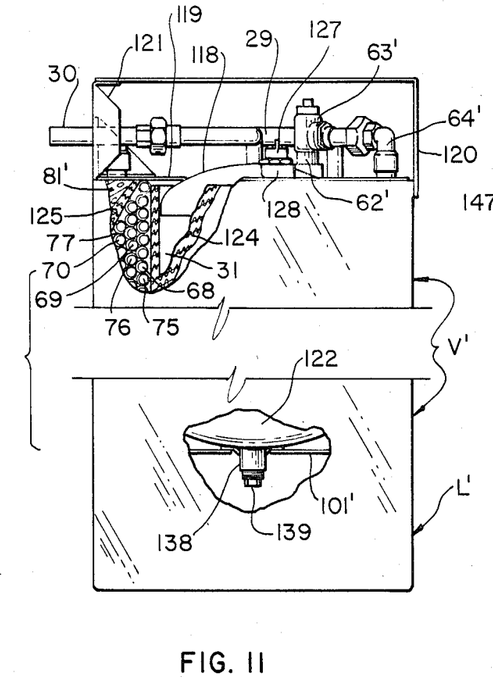
FIG. 11 is a condensed side elevation of the unit of FIG. 10, with exterior auxiliary parts omitted and a portion at the top and the bottom of the heater broken away, to show the interior construction.
Figure 12:
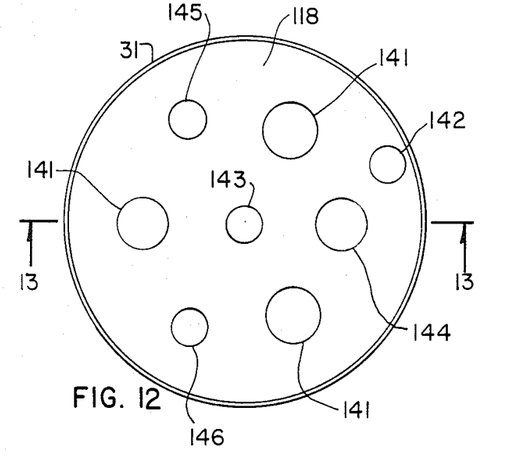
FIG. 12 is a top plan view, on an enlarged scale, of the tank of the heater of the unit of FIG. 10.
Figure 13:
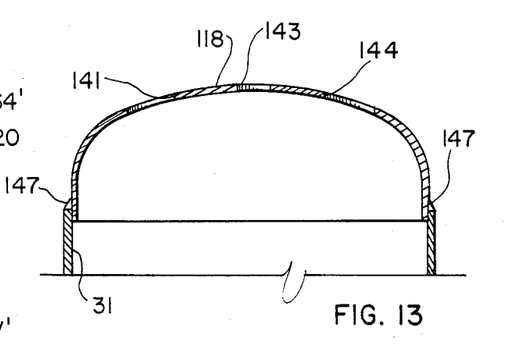
FIG. 13 is a fragmentary cross section, taken along line 13—13 of FIG. 12 and showing particularly the upper head of the tank.

The lower end of shell 31 is closed by a semi-elliptical lower head 122 of FIG. 11, which is also welded to the sleeve. The semi-elliptical heads permit a thinner material to be used and thus decrease the cost of producing the water heaters. The water heater is supported from partition 118 by a series of removable brackets 123. In addition to the heat exchanger tubes, insulation 124, as of fiberglass, may surround the water heater and similar insulation 125 surround the heat exchange tubes. Insulation 81', as of urethane foam, may also be placed between insulation 125 and the outer shell of upper housing U'. As before, an inlet pipe 29 for fresh water, preheated by the heat exchanger, enters the top of the tank adjacent the outer edge of upper head 118, while an outlet pipe 30, for supplying water heated in the water heater to the dishwasher, connects with the upper head 118 at approximately the center thereof. Also, a pressure relief pipe 62' connects with the central portion of the heater tank, extending to a pressure relief valve 63' and an exhaust pipe 64' which may extend downwardly in a corner of upper housing U' for discharge into a waste water tank corresponding to tank T of FIG. 5. Three electric heating elements or heaters 127 extend into the central portion of the tank, similar to the central portion of FIG. 5, with each engaging a threaded ring fitting 128. Each heater is provided with threads on the outside for engagement with cooperating threads on the inside of the corresponding ring 128, which is tubular and extends through an axially aligned, circular hole in upper head 118 and is welded to the top of the head by an encircling weld, while maintained in an upright position.

A temperature regular control 129 for heaters 127 may be connected by a cable 130 with a sensor 131, extending downwardly into the central portion of the tank and engaging an interiorly threaded ring fitting 132 which is installed in a manner similar to ring fitting 128. Also, a high temperature regulator 133 may be connected by a cable 134 with a sensor 135 extending into the tank and similarly threaded into an interiorly threaded ring fitting 128. High temperature regulator 133 may be connected with the controls for heaters 127, and/or the relief valve 63'. The lower head 122, as in FIG. 11, which extends downwardly to top wall 101' of lower housing L', may be provided at the center with a depending nipple 138 provided with a threaded plug 139, which may be removed for draining any sediment which may collect in the bottom of the tank, such as falling off the electric heaters. For accommodating the various parts which extend into the tank, a series of holes, as in FIGS. 12 and 13, may be provided in upper head 118, including holes 141 for the ring fittings 128 for heaters 127, a hole 142 for the inlet pipe 29, a hole 143 for the outlet pipe 30 and holes 145 and 146 for the respective ring fittings 132 and 136 for the sensors.

Figure 14:
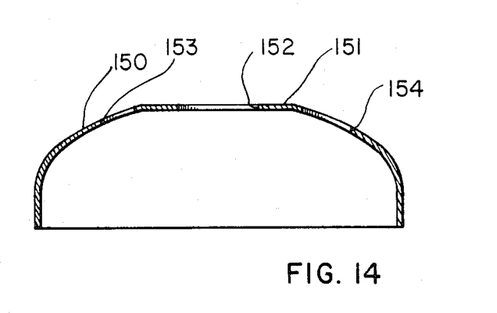
FIG. 14 is a vertical section, similar to FIG. 13, but showing an alternative tank head.

An alternative upper head 150 of FIG. 14 is particularly adapted to accommodate a single electric heater for a water heater which does not require three heaters. Upper head 150 is generally semi-elliptical but has a flat area 151 at the top, in which a hole 152 may be produced for the heater, with studs or the like for bolting a heater flange in position against flat 151. Such a construction permits a heater having a flat mounting flange to be used, rather than requiring a threaded fitting to be welded to a curved surface of the upper head, as when installed in holes 141 in the upper head, shown in FIGS. 12 and 13. Alternative head 150 may be provided with smaller holes 153 and 154, as for one or more sensor fittings or an outlet pipe. A hole for the inlet pipe is, of course, closer to the edge of the head than the holes shown in FIG. 14, such as corresponding to hole 142 of FIG. 12.

Figure 10:
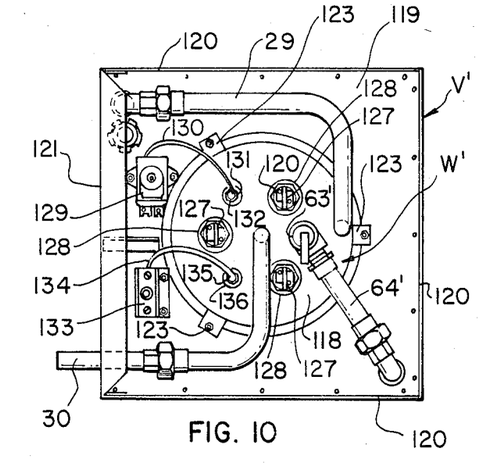
FIG. 10 is a top plan view, similar to FIG. 2, of an alternative energy recovery unit, having particularly an alternative water heater.
Figures 15, 16, 17, 18, 19, 20:
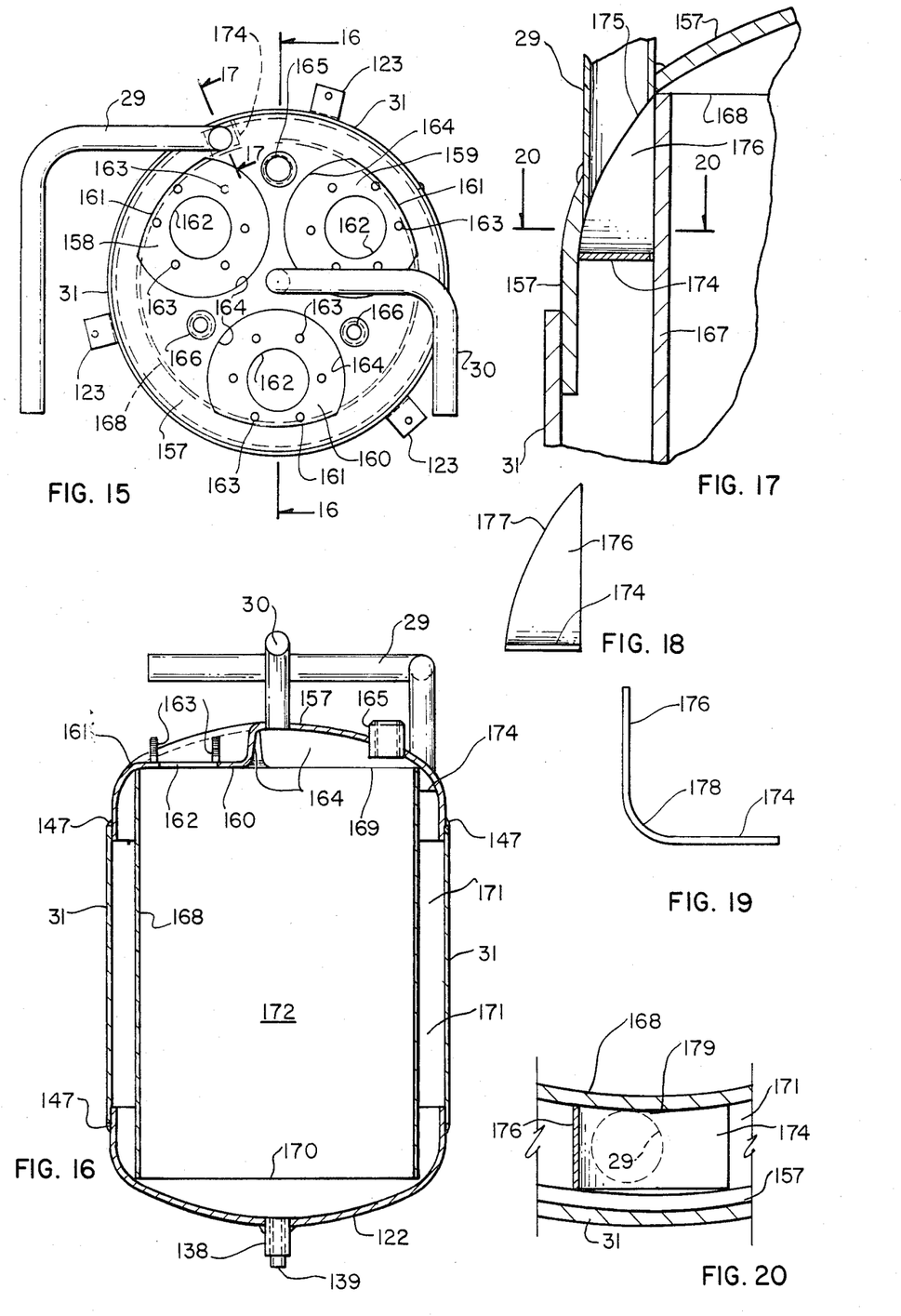
FIG. 15 is a top plan view of a tank and conduit connections of a further alternative water heater.
FIG. 16 is a vertical section taken along line 16—16 of FIG. 15.
FIG. 17 is a fragmentary vertical section, on an enlarged scale, taken along line 17—17 of FIG. 15.
FIG. 18 is a front elevation of an inlet water deflector.
FIG. 19 is a side elevation of the inlet water deflector of FIG. 18.
FIG. 20 is a fragmentary section, taken along line 20—20 of FIG. 17.

A further alternative water heater W'' of FIGS. 15 and 16 includes a tubular shell 31 which is attached, as by welding, to a generally semi-elliptical upper head 157 which extends through an appropriate opening in a partition, corresponding to partition 119 of FIG. 10, being provided with brackets 123 for attachment of the water heater to the partition. The lower end of shell 31 is attached, as by welding, to a lower semi-elliptical head 126 provided with a depending, threaded nipple 138 having a drain plug 139. In order to support the heaters, such as three in number and corresponding to heaters 127 of FIG. 10, except for a lateral, planar flange having holes for engaging studs, rather than exterior threads, three predominantly annular flats 158, 159 and 160, except for a greater radius arc 161 at the outer edge, are provided with a central hole 162 and a ring of studs 163, the flats being at equally spaced positions around upper head 157. Each flat is formed by the bottom of a well 164 provided by cold or hot forming prior to drilling holes 161 or installation of studs 163, while the ring of studs 163 is positioned to engage a series of bolt holes in the planar attachment flange of the respective heater. Such attachment flanges are conventionally formed on a heater, so that the formation of the flats 158, 159 and 160 and the ring of studs 163 eliminate the requirement for welding a large special fitting for each heater. The heaters extend within the tank in a conventional manner, although due to the depression of the wells in which the flats are formed, the length of the heaters may be somewhat less than those provided for the heater W' of FIGS. 10 and 11. Also attached to head 157 are a threaded nipple 165 for a pressure relief valve, such as corresponding to valve 63' of FIG. 10, and a pair of threaded nipples 166 for a pair of sensors, such as corresponding to sensors 132 and 135 of FIG. 10. A partition or ring 168 having an upper edge 169 and a lower edge 170 is mounted inside the tank to provide an annular inlet space 171 around the inside of the shell 31, which inlet space is appropriately considerably less in thickness and volume than the space 172 within the ring.

Inlet pipe 29 extends downwardly at a position between the outer edge of upper head 157 and ring 168, as in FIG. 17, and is welded to the head, while upper edge 169 of ring 168 engages the inside of upper shell 157 and is attached thereto, as by welding, at a position just inside inlet pipe 29. As in FIG. 16, each arc 161 at the outer edge of a flat 158, 159 and 160 is formed to correspond to the diameter at the outer edge of partition ring 168, so that the upper edge 169 of the ring engages the underside of each flat just within the arc 161. A continuous weld may not be necessary for attachment of partition 168 to the inside of head 157, since a series of tack welds, as attaching the upper edge 169 of partition 168 to the underside of each flat 158, 159 and 160, as well as a tack weld between each pair of flats, may be sufficient, since a small amount of leakage between inner space 172 and outer space 171 may be tolerated, inasmuch as heat leaked to the outer space 171 will be returned to the inner space as incoming water flows from the outer space to the inner space.

A deflector 174 is disposed between the ring 168 and the upper head 157, directly beneath the lower end of inlet pipe 29, as indicated in dotted lines in FIG. 20, while the lower edge 175 of pipe 29, shaped to correspond to the inside of head 157, as in FIG. 17, extends through a hole in the head and may be welded to the head on the outside. Deflector 174, as in FIG. 18, is provided with an upright flange 176 which may be tack welded along its outer edge, as in FIG. 20, to the inside of head 157 prior to installation of ring 168 and attachment of shell 31 to the head. The outer edge 177 of flange 176, as in FIG. 18, is shaped to fit the inside of head 157. A curved portion 178 of the deflector, as in FIG. 19, may join the horizontal portion with upright flange 176, to insure that incoming cold water discharged from pipe 29 will be directed horizontally, while a notch 179 in the edge of deflector 175 fits against the outer edge of ring 168, as in FIG. 20. As will be evident, the deflector 174 causes the inlet liquid to flow in an annular path around the space 171 between ring 168 and shell 31 in a manner described previously in connection with ell 41 of FIG. 6. One purpose of the annular flow of the incoming water, which thus circulates around the ring 168, is that the incoming circulating water will be preheated by the heated water inside ring 168, but will also be insulated from the temperature outside the unit by the heat exchanger corresponding to the heat exchanger having tubes 68, etc. of FIG. 11.

The lower edge 170 of ring 168 is placed fairly close to the inside of lower head 126 for the purpose of producing an increased rate of flow of water, similar to "wire drawing" as it passes from the annular space 171 outside ring 168 to the space 172 inside the ring. This flow will tend to maintain in circulation small flakes which may fall off the heaters, so that such small flakes will pass on with the water supplied by the heater to the dishwasher and the like. However, larger flakes or particles will collect as sediment in the bottom of the lower head 122, from which they may be removed periodically through the drain plug 139.

The alternative water heater W' of FIGS. 16 and 17 may be used in a unit corresponding to the unit U' of FIGS. 10 and 11, i.e. with corresponding inlet pipe 29 and outlet pipe 30, as well as heaters corresponding to heaters 130 whose flanges are installed against the respective flats 158, 159 and 160, as well as a pressure relief valve pipe attached to nipple 165 and a sensor extending through each of nipples 166 into the tank, with one sensor controlling the operation of the heaters and the other sensor being a high temperature sensor which will actuate the relief valve if the pressure responsive feature thereof fails to operate when an undue pressure is produced. Or, the high temperature sensor may be set for a temperature which corresponds to a slightly lower pressure than the pressure responsive mechanism of the relief valve, so that the high temperature sensor will normally operate to open the relief valve, but the latter will operate automatically if the pressure corresponding to the temperature for which the high temperature sensor is set is exceeded.

The head shown in FIG. 14, as previously described, may be substituted for upper head 157 of FIGS. 15 and 16, when a smaller capacity heater is desired, in which only one electric heater becomes necessary. As indicated previously, a single flat 151 is placed at the center of the head 150, since it is more readily produced at that position. In addition, a series of studs corresponding to studs 163 of FIGS. 15 and 16 may be mounted on flat 151 of FIG. 14, surrounding hole 152. Head 150 of FIG. 14 may be attached to a shorter shell than shell 31 of FIG. 16, or the head 150 may be smaller in diameter and the shell correspondingly smaller, to provide the volume necessary for a smaller heater, for which only one electric heater is necessary.

The tank of the water heater W' of FIGS. 10 and 11 may be provided with an interior ring corresponding to ring 168 of FIG. 16, while the lower edge may extend to a point closely adjacent the lower head 122 so as to produce an increase in velocity of incoming water, again in order to obtain a circulation of smaller flakes and particles. Again, larger flakes and particles will tend to collect in the bottom of the lower head 126 of FIG. 11 and may be drained therefrom periodically by removing plug 139. Since the heater tank is centered over the screen 11 of FIG. 5, any water drained from the heater tank will pass into tank T and then through the heat exchanger, thereby avoiding loss of the heat held by this water. As will be evident, any larger flakes and particles drained into waste water tank T will, after passage through the heat exchanger, be discharged into the outlet cup and thence discarded. The operation of the alternative water heater W' of FIGS. 10 and 11 and the further alternative water heater W" of FIGS. 15 and 16 will be essentially as before, although the wire-drawing effect of the slight spacing between the lower edge of the ring 168 of FIG. 16 and the lower head 122, as well as the spacing of the corresponding ring of the alternative water heater W' of FIGS. 10 and 11, coupled with the concave shape of the lower head 122 of FIGS. 11 and 16, will circulate smaller particles but permit larger particles to collect without impeding the flow of the incoming water into the heating space. This is an additional advantage of the water heater constructions of FIGS. 10-14 and 15-19.

Although more than one preferred embodiment of this invention has been illustrated and described. it will be understood that other embodiments may exist and that various changes may be made without departing from the spirit and scope of this invention.

What is claimed is:

1. An energy recovery unit for a dishwasher and the like, comprising:

a heat exchanger having coils surrounding a central space, each said coil being formed of first and second tubes disposed in heat exchange relationship with each other and with the tubes of adjacent coils, said first and second tubes being respectively adapted to carry warm waste water from said dishwasher and the like and cooler feed water for a hot water heater;

said heat exchanger having a waste water inlet and outlet for said tubes adapted to carry warm waste water, a feed water inlet for said tubes adapted to carry cooler feed water and a feed water outlet for feed water heated or warmed by heat exchange with said warm waste water;

a hot water heater disposed in said central space and including means containing the water to be heated provided with inlet means connected to the feed water outlet of said heat exchanger and outlet means adapted to supply heated water to said dishwasher and the like;

means for supplying said waste water from said dishwasher and the like to said waste water inlet of said heat exchanger; and means for supplying heat to the water in said water containing means of said hot water heater.

2. An energy recovery unit as defined in claim 1, wherein:

said water containing means of said hot water heater includes a tank containing the water to be heated; and said heating means comprises one or more electric immersion type heaters in said tank.

3. An energy recovery unit as defined in claim 2, wherein:

said tank is upright and has a top generally curved convexly in an upward direction;

said top is provided with at least one flat area; and means for attaching to each said flat area an electric immersion heater having a lateral flange engageable with said area.

4. An energy recovery unit as defined in claim 3, wherein:

each said flat area is generally horizontal; and each said electric heater is mounted in a substantially upright position.

5. An energy recovery unit as defined in claim 1, wherein:

said hot water heater includes an upright tank containing water to be heated;

said tank having upper and lower ends and an inwardly spaced partition depending from said upper end to provide an inner heating space larger than an outer inlet space, said partition terminating above the lower end of said tank, said outlet means being connected to the upper end of said inner space, and said inlet means being connected with the upper end of said outer space;

said heater including means for producing an annular circulation of the incoming water around said inlet space prior to passing beneath the lower edge of said partition to said inner space; and heating means for said inner space.

6. An energy recovery unit as defined in claim 5, wherein:

said tank has an outlet for heated water communicating with the upper portion of said inner heating space; and said partition closely approaches the lower end of said tank to produce a flow into said inner heating space of incoming water which will tend to cause small particles which may fall off a heater to be circulated to said outlet.

7. An energy recovery unit as defined in claim 6, wherein:

said lower end of said tank has drain means communicating with said inner heating space for removal of particles which may fall off a heater but are sufficiently large to avoid being circulated to said outlet.

8. An energy recovery unit as defined in claim 5, wherein said means for producing an annular circulation of said incoming water includes:

a pipe extending downwardly through the top of said tank to communicate with said outer inlet space; and a deflector disposed beneath said pipe generally transversely of said inlet space and having a generally upright flange spaced rearwardly from said pipe.

9. An energy recovery unit for a dishwasher and the like, comprising:

a heat exchanger having coils surrounding a central space, said coils including first and second tubes respectively adapted to carry warm waste water from said dishwasher and the like and cooler feed water for a hot water heater;

said heat exchanger having a waste water inlet and outlet for said tubes adapted to carry warm waste water, a feed water inlet for said tubes adapted to carry cooler feed water and a feed water outlet for feed water heated or warmed by heat exchange with said warm waste water;

means for supplying said waste water from said dishwasher and the like to said waste water inlet of said heat exchanger;

a hot water heater including a tank containing water to be heated disposed in said central space and provided with inlet means connected to the feed water outlet of said heat exchanger and outlet means adapted to supply heated water to said dishwasher and the like;

at least one generally upright electric immersion heater in said tank; and closed conduit means independent of the supply of heated water to said dishwasher for recirculating a portion of the water from the outlet to the inlet of said hot water heater while said heaters are heating.

10. An energy recovery unit as defined in claim 9, wherein:

a recirculation pump has an inlet connected to said tank outlet means and an outlet connected to said tank inlet means.

11. An energy recovery unit as defined in claim 10, wherein:

an inlet pipe for said heater extends from said heat exchanger to a position above said heat exchanger;

an outlet pipe for said heater extends above said heater; and said recirculation pump is connected to said inlet and outlet pipes above said heat exchanger and heater.

12. An energy recovery unit for a dishwasher and the like, comprising:

a heat exchanger having coils surrounding a central space, said coils including first and second tubes respectively adapted to carry warm waste water from said dishwasher and the like and cooler feed water for a hot water heater;

said heat exchanger having a waste water inlet and outlet for said tubes adapted to carry warm waste water, a feed water inlet for said tubes adapted to carry cooler feed water and a feed water outlet for feed water heated or warmed by heat exchange with said warm waste water;

a hot water heater disposed in said central space and provided with inlet means connected to the feed water outlet of said heat exchanger and outlet means adapted to supply heated water to said dishwasher and the like;

means for supplying said waste water from said dishwasher and the like to said waste water inlet of said heat exchanger;

a relief valve connected to the upper portion of said heater to relieve excessive pressure produced by heat;

said unit including a tank beneath said heat exchanger for receiving waste dishwater; and a pipe extending from said relief valve to said tank.

13. An energy recovery unit as defined in claim 12, including:

a housing enclosing said heat exchanger and rectangular in a lateral direction; and said pipe extending from said relief valve extends through a corner of said housing.

14. A method of recovering waste energy from a dishwasher having wash and rinse cycles and the like, comprising:

transferring waste wash water from said dishwasher to a collection tank disposed in a lower position;

transferring such waste water from said collection tank to a heat exchanger surrounding a hollow central space and having coils formed by juxtaposed sets of tubing which carry such waste water in one set of tubing and cold feed water for a hot water heater in another set of tubing;

passing said waste water and feed water in countercurrent relationship through said heat exchanger;

passing said preheated feed water to a hot water heater including a tank located in the central space of said heat exchanger;

heating the water in said hot water heater; and supplying hot water from said hot water heater to said dishwasher at selected times.

15. A method as defined in claim 14, including:

circulating incoming preheated feed water downwardly and annularly in an annular, outer space connecting only with the lower end of a larger inner space of said hot water heater tank; and supplying heat to the water in said inner space.

16. A method as defined in claim 15, comprising:

supplying heat to the water in said inner space through generally upright electrical resistance, immersion heaters.

17. A method as defined in claim 16, comprising:

recirculating water from an outlet of said inner heating space through a closed conduit to an inlet for said outer space independently of the supply of heated water to said dishwasher.

18. A method of recovering waste energy from a dishwasher having wash and rinse cycles and the like, comprising:

transferring waste wash water from said dishwasher to a collection tank disposed in a lower position;

transferring such waste water from said collection tank to a heat exchanger surrounding a hollow central space and having coils formed by juxtaposed sets of tubing which carry such waste water in one set of tubing and cold feed water for a hot water heater in another set of tubing;

passing said waste water and feed water in countercurrent relationship through said heat exchanger;

passing said preheated feed water to a hot water heater located in the central space of said heat exchanger;

heating the water in said hot water heater;

removing fluid at excess temperature and/or pressure from said hot water heater;

transferring said removed fluid to said waste water collection tank; and supplying hot water from said hot water heater to said dishwasher at selected times.

* * * * *